United States Patent [19]
Ellis et al.

[11] Patent Number: 4,592,494
[45] Date of Patent: Jun. 3, 1986

[54] SEALED BARRIER CONTAINER

[76] Inventors: John P. Ellis; Chris P. Ellis, both of 209 Lincoln Mall Shopping Center, Matteson, Ill. 60443

[21] Appl. No.: 702,628

[22] Filed: Feb. 19, 1985

[51] Int. Cl.$^4$ .............................................. G01F 13/00
[52] U.S. Cl. ................................... 222/252; 222/357; 222/331
[58] Field of Search .............. 222/252, 278, 344, 357, 222/363, 364, 368, 330, 331, 361, 362, 409

[56] References Cited

U.S. PATENT DOCUMENTS

| | | | |
|---|---|---|---|
| 529,528 | 11/1894 | Goff | 222/344 |
| 1,077,999 | 11/1913 | Rees | 222/361 |
| 2,286,554 | 6/1942 | Lieberman | 222/333 |
| 2,732,086 | 1/1956 | Schnyder | 222/252 |
| 2,852,167 | 9/1958 | Lempart | 222/361 |

FOREIGN PATENT DOCUMENTS 0257422 1/1912 Fed. Rep. of Germany .

*Primary Examiner*—Joseph J. Rolla
*Assistant Examiner*—Jay I. Alexander
*Attorney, Agent, or Firm*—Basil E. Demeur; Robert E. Knechtel

[57] ABSTRACT

There is provided a sealed barrier container for containing a supply of product in bulk form and providing limited access thereto for a user to meteringly dispense a portion thereof into a product receptacle, formed by an enclosed container including a product hopper for containing a supply of product, the hopper having an access panel movable between an access position and a closed position, a dispensing portion positioned in operative relation with respect to the hopper, the dispensing portion including a product ramp contained therein and in open communication with the hopper at one end, and in open communication with an exit chute at the opposed end, metering dispensing means positioned in operative relationship with respect to the product ramp and being rotatably mounted thereby to dispense metered amounts of bulk product from the hopper to the ramp, scoop means in operative relationship with respect to the ramp being reciprocable with respect to the exit chute, the scoop means including external control means to permit the operator to control the scoop means externally from the sealed barrier container, and individualized product receptacle means adapted for disengageable engagement with the exit chute such that bulk product dispensed from the hopper onto the product ramp may be manipulated by means of the scoop means into the receptacle means via the exit chute such that metered amounts of product may be withdrawn from the container while avoiding consumer access to the interior confines thereof.

16 Claims, 9 Drawing Figures

SEALED BARRIER CONTAINER

BACKGROUND OF THE INVENTION

It is well known that in many applications, various products are sold in bulk form to the consuming public, and in most typical applications, the product is contained within bins or the like, thereby permitting the consumer to purchase any desired quantity of the product from the bulk container. This has become especially prevalent in the food industry since many food products are now sold in bulk form in order to permit the consumer to purchase any desired amount or poundage of the product by withdrawing that amount of product from a container, and placing the desired amount of product in an individualized container such as a bag or the like. The other advantage that this system of distribution achieves is that an enterprise is permitted the option of eliminating the necessity for clerks or additional personnel to attend to the matter of weighing out metered amounts of product based upon the consumer's request order. Hence, rather than food products being packaged in individual packages and sealed with heat shrinkable material, or other such individual packages as is typical for fruits and vegetables, such products may be dispensed from bins and packaged by the consumer himself.

However, it has also become clear that to insure the sterility of the product, and to prevent unauthorized tampering with the prooduct contained in any such bin or container, steps must be taken to prevent unauthorized personnel from tampering with the product contained in bulk bins. This again, is especially true in connection with food products or other products intended for consumption. One method of insuring sterility has been to package products in pre-determined weight formats, the products being pre-packaged by the vendor thereof. As indicated above, this is a typical method for packaging fruits and vegetables such as tomatoes, lettuce and the like, where the product is contained within a shell base, and a heat shrinkable plastic is wrapped over the product. The consumer would then be aware of any product tampering by noticing whether or not the heat shrinkable plastic overlay has been torn or otherwise tampered with. The difficulty with that packaging format is that the consumer is not given any latitude of choice in terms of the quantity of product to be purchased. In other words, if a consumer desires to purchase a certain amount of given product in a weight other than what has been pre-packaged, the consumer must either purchase an amount less than he desires, or an amount greater than what he desires, depending on the exact amounts or weights of product that have been pre-packaged by the vendor.

Furthermore, it will be appreciated that the pre-packaging of a product in individualized containers, when performed by the vendor, requires not only specialized equipment, but also increases the labor associated with the packaging of the product. Hence, additional clerks or other personnel are required in order to weigh and package the product, attend to the heat shrinking of the plastic overlay, and then placing the product out for display in appropriate display counters. As is now known especially in the food industry, in order to maintain minimal price increases in the price of food, labor and packaging costs must be reduced in order to maintain food prices at reasonable levels. Hence, if retail establishments which seek to vend food products from bulk containers are to be reestablished in the market place, a secure dispensing system is required. The difficulty now facing those enterprises is the matter of providing limited access sealed barrier containers which permit limited access thereto by the consumer while permitting the metered dispensing of any desired quantity of food, and simultaneously maintaining absolute sterility and the prevention of product tampering.

There has been disclosed one format of a sealed barrier container in my co-pending application Ser. No. 06/616,916 entitled Sealed Barrier Container pursuant to which a sealed bin is provided, access to which is provided through a pair of openings provided in the container which are sealed by means of a flexible pouch barrier which thereby permits the consumer to insert their hands against the outer surface of the flexible barrier, but due to the flexibility of the barrier, permits the operator to grasp product from the bin, and to deliver the same to an exit chute. The system described therein also provides an exit chute to which an individual receptacle such as a bag or the like may be affixed such that product which is grasped by the consumer via the flexible barrier material may be delivered to the exit chute and travel into the individualized receptacle located at the terminal end of the exit chute.

The present application is intended as an improvement over the structure as disclosed in the aforementioned pending application in that it attempts to eliminate the problem of potential access by an unauthorized personnel to product contained within the sealed barrier container. As indicated previously, the original concept contemplated that a flexible barrier material would be utilized to seal the contents of the container from the consumer, the consumer simply placing their hands onto the external surface of the flexible barrier and due to the flexibility thereof, permit the consumer to grasp any desired amount of product from the bin for delivery to the exit chute. However, it was deemed advisable to develop a more refined sealed container which permits a greater ease of use while simultaneously avoiding any contact as between the consumer and the internal confines of the container. It is therefore deemed desirable to develop a container which eliminates the necessity for the consumer to place their hands inside of the container in order to grasp a metered amount of product therein, and to deliver the same to an exit chute. Hence, the present invention provides a sealed barrier container wherein the consumer or operator is required to manipulate scoop means located within the container, from external control sources such that access to the interior confines of the sealed container is completely eliminated.

OBJECTS AND ADVANTAGES

It is therefore the principal object of the present invention to provide a sealed barrier container of the type which eliminates any access to the product contained within the container, requiring the operator to manipulate control means externally of the container thereby to obtain and deliver to an exit chute any desired amount of product as contained within the bin.

In connection with the foregoing object, it is an object of the present invention to provide a sealed barrier container of the type described wherein the container is formed by a completely sealed container formed by an upper portion, a base for supporting the container, and a dispensing portion, the upper portion provided with a bulk product hopper for containing a supply of bulk product, the hopper provided with an access panel movable between an access position and a closed position for permitting the hopper to be filled with product, a dispensing portion being positioned in operative relation with respect to the hopper and including a product ramp in communication with the hopper at one end, and to an exit chute at the opposed end, metering dispensing means positioned intermediate the hopper and the product ramp and being rotatably mounted therein thereby to dispense metered amounts of product from the hopper onto the product ramp, scoop means in operative relationship with the ramp and reciprocable with respect to the chute which include external control means associated therewith and positioned externally with respect to the container whereby the manipulation of the control means will manipulate the scoop means thereby to permit product from the hopper to be delivered to the ramp, and then from the ramp, delivered to the exit chute into individualized product receptacle means disengageably engaged thereon.

In conjunction with the foregoing object, it is a further object of the present invention to provide a sealed barrier container of the type described wherein the metering dispensing means is formed by a star shaft rotatably mounted within the hopper and positionally interposed between the hopper and the product ramp, the star shaft adapted to provide multiple product carrying compartments such that rotation of the star shaft causes product from the hopper to be deposited in the product compartments and continued rotation of the star shaft thereby carrying and delivering the product from the product compartments to the product ramp thereby to place the product in position for delivery to the exit chute by manipulation of the scoop means via the external control means.

In conjunction with the foregoing objects, it is a further object to provide a sealed barrier container of the type described wherein the scoop means comprises a claw having a substantially enclosed chamber, the claw provided with a control shaft extending laterally outwardly through the dispensing portion of the container, the control shaft having an external grasp to permit the operator to grasp and manipulate the control shaft thereby to control the movement of the claw in order to capture product from the product ramp and deliver the same to the exit chute for ultimate delivery to the product receptacle.

In connection with the foregoing object, it is a further object of the present invention to provide a sealed barrier container of the type described wherein the scoop means further includes a control shaft movement guide which is adapted to permit the arcuate as well as reciprocable movement of the control shaft and claw within the dispensing portion of the container.

A further object of the present invention is to provide a sealed barrier container of the type described wherein the container is provided with two pairs of opposed shaft mounting plates, one of each of the pairs of shaft mounting plates mounted on opposed side walls of the hopper, each having an enlarged central aperture, and each pair of mounting plates having an aperture guard interposed between the respective ones of the pair of mounting plates thereby to maintain non-accessibility to the interior confines of the hopper, the aperture guard being radially movable within the interposed confines of the pair of mounting plates such that the star shaft may be controlled both arcuately as well as reciprocably thereby to permit large as well as small metered amounts of product to be captured from the hopper and delivered to the exit chute.

Still a further object of the present invention is to provide a sealed barrier container of the type described wherein an alternate embodiment of the subject container is provided which includes a second product ramp positioned within the dispensing portion of the container, and positioned below the first product ramp, the second product ramp being in open communication with the hopper at one end thereof and in open communication with the exit chute at the opposed end thereof, the metered dispensing means being interposed between the hopper and each of the first and second product ramps, such that counter clockwise rotation of the metered dispensing means captures product from the hopper and delivers the same to the first product ramp, while clockwise rotation of the metered dispensing means captures product from the hopper and delivers the same to the second product ramp, the second product ramp being mounted along the decline extending from the hopper to the exit chute such that product delivered to the second product ramp will automatically travel to the exit chute to be deposited in a product receptacle.

Further features of the invention pertain to the particular arrangement of the elements and parts whereby the above-outlined and additional operating features thereof are contained.

The invention, both as to its organization and method of operation together with further objects and advantages thereof, will best be understood by reference to the following specification taken in conjunction with the accompanying drawings.

BRIEF DESRIPTION OF DRAWINGS

FIG. 1 is a plan view, partly in cross section, illustrating one embodiment of a sealed barrier container according to the present invention which includes an inner portion containing a product hopper, an intermediate dispensing portion containing first and second product ramps, having the metered dispensing means interposed between the hopper and each of the two product ramps, and an exit chute containing an individualized product receptacle engagement collar such that product may be captured from the hopper and delivered via the product ramps to the exit chute and into the product receptacle;

Figure 7:
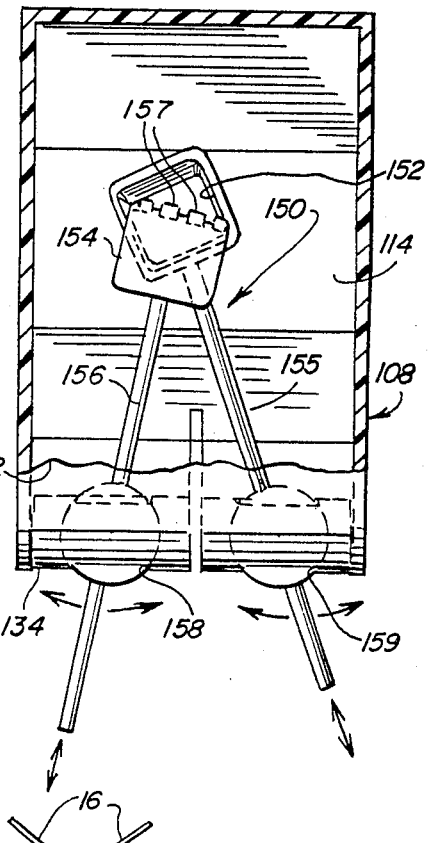
Figure 8:
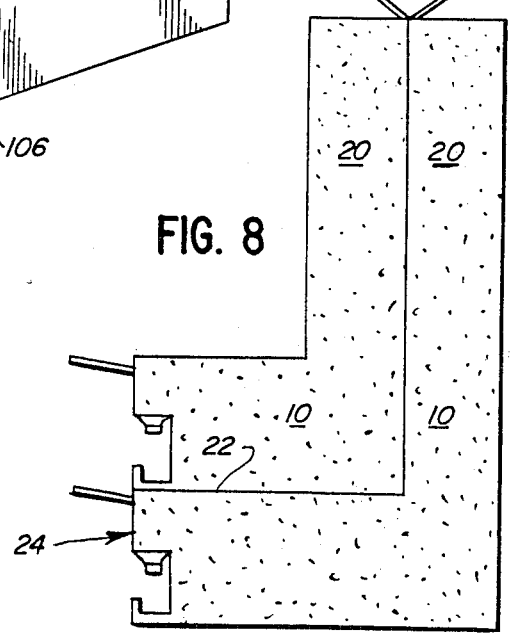

FIG. 7 is a top plan view in cross section, illustrating an additional alternate embodiment of scoop means associated with a sealed barrier container wherein an pair of scoop implements are provided for permitting the capturing of food products from the food ramp and the delivery thereof to an exit chute; and FIG. 8 is a side elevational view illustrating a pair of sealed barrier containers in stacked orientation.

Figure 9:
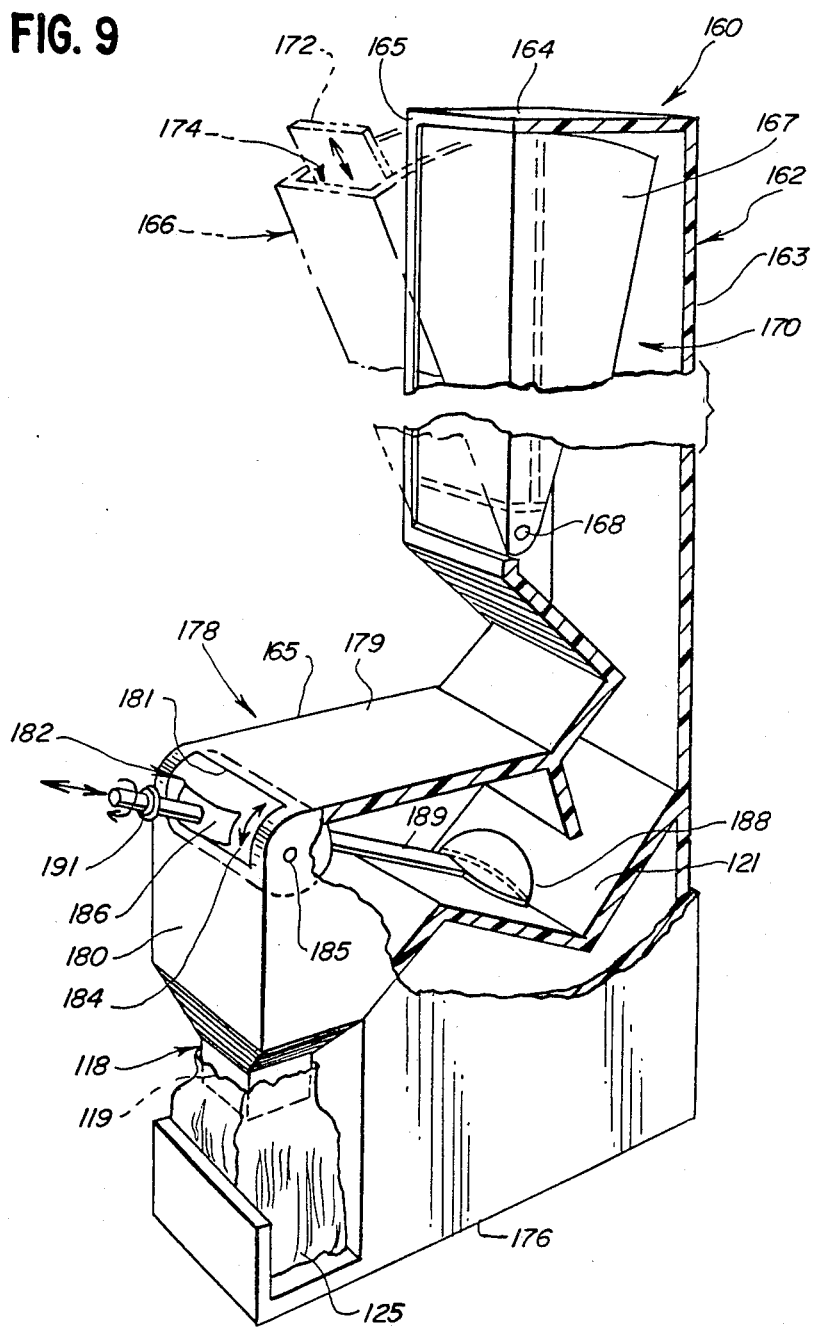

FIG. 9 is a plan view, partly in cross section, illustrating an alternate embodiment of a hopper having a pivotally movable access panel, and an alternate embodiment of scoop means associated with the product ramp for achieving arcuate, reciprocal, and rotatable movement of the scoop means relative to the product ramp and further arcuate movement of the scoop means relative to the side walls of the dispensing portion of the hopper.

BRIEF SUMMARY OF THE INVENTION

In summary, the present invention provides an entirely sealed container having only an access panel movable between an access position and a closed position to permit vendor to provide a supply of bulk product to the interior confines of the container, container supported by a base, having a dispensing portion located intermediate the hopper area where the bulk product is contained, and the base. The dispensing portion is provided with a metering dispensing system for meteringly dispensing product onto a product ramp, and further including scoop means associated with the ramp having external control means for permitting a consumer to operate the scoop means from the external confines of the container thereby to manipulate the scoop means in order to capture product dispensed onto the food ramp and deliver the same to an exit chute where an individualized product receptacle is located. The sealed container of the present invention maintains sterility and product integrity by avoiding any consumer contact with the product contained within the container, permitting the consumer only to manipulate the metering dispensing means to dispense product from the hopper onto the product ramp, and to manipulate the scoop means to manipulate and deliver product from the product ramp to an exit chute where a product receptacle may be located to receive the product and permit the consumer to then disengage the receptacle and carry away the metered amount of product therein. The scoop means is designed to achieve reciprocal as well as arcuate motion such that the scoop means may be conveniently manipulated in order to grasp product on the food ramp and to deliver the same to the exit chute and into the product receptacle.

DETAILED DESCRIPTION OF THE DRAWINGS

Figure 1:
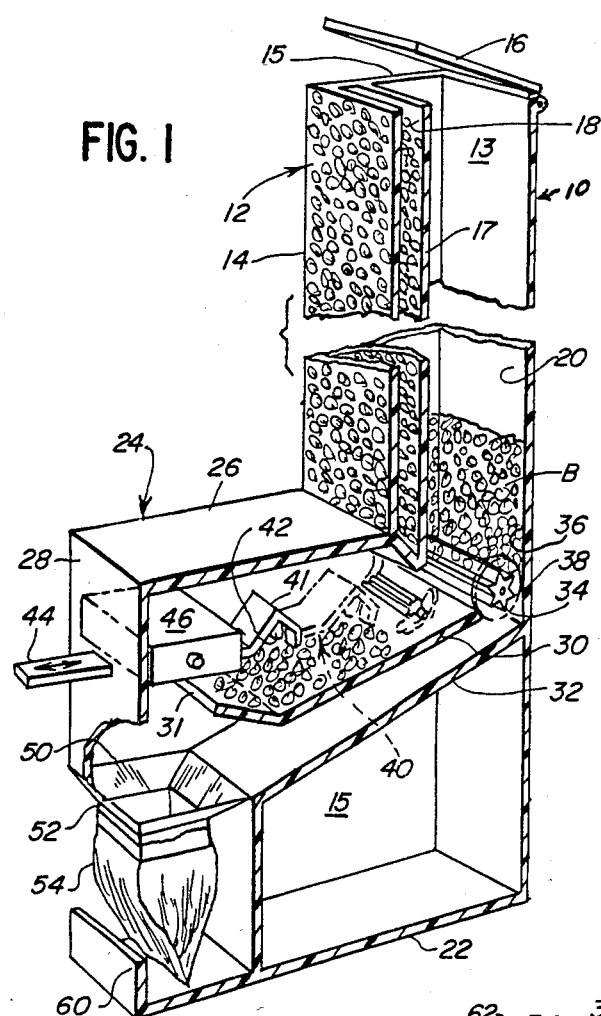

With reference to FIG. 1 of the drawings, a sealed container 10 is illustrated in accordance with the present invention. The container 10 is shown to include an upper portion 12 which is formed by a back wall 13, a front wall 14 and opposed side walls 15. An access panel 16 is provided which, as shown in FIG. 1, is pivotally mounted to the upper portion 12 of the container 10. In the embodiment as illustrated in FIG. 1, an inner front wall 17 is illustrated, which is spaced for a short distance from a front wall 14, and which is also shown to be bounded by the opposed side walls 15 such that an enclosed chamber 18 is created. The enclosed chamber 18 is intended for product display such that product contained within the sealed container 10 may be illustrated to the consumer.

The upper portion 12 contains a hopper 20 which is intended to contain a supply of bulk product B therein. As illustrated in FIG. 1, the hopper 20 is shown to be elongate along the vertical axis of the container 10, in order to provide a hopper 20 of sufficient capacity to contain a fairly large amount of bulk product B.

The container 10 includes a base 22 at the lower end thereof for supporting the container 10 on an underlying flat surface. Intermediate the upper portion 12 and the base 22 is a dispensing portion 24 which, as illustrated, is shown to be elongate along the horizontal axis of the container 10. The dispensing portion 24 is shown to be fully contained within the opposed side walls 15 of the container 10, and includes a top wall 26 and a front wall 28 thereby to fully enclose the dispensing portion 24 and eliminate access by any unauthorized personnel. The dispensing portion 24 further includes a first product ramp 30 which is mounted between the opposed side walls 15 and is positioned along the elongate horizontal axis of the dispensing portion 24 at a slight decline. In the embodiment as illustrated in FIG. 1, a second dramp 32 is shown to be positioned within the dispensing portion 24 and similarly mounted between the opposed side walls 15 along the elongate horizontal axis of the dispensing portion 24 and at a slight decline as viewed from the hopper 20 toward the front wall 28 of the container 10.

A metering dispensing star shaft 34 is shown to be mounted between opposed side walls 15, and interposed between the hopper 20, and the first and second product ramps 30 and 32 respectively. The star shaft is shown to include a plurality of product compartments 36 which are formed as a result of the star configuration of the star shaft 34, in order to capture bulk product B from the hopper 20 and to deliver the same to the respective product ramps 30 and 32 respectively. The star shaft 34 is shown to be rotatably mounted between the opposed side walls 15 of the container 10, and includes a control knob 38 which is fixedly secured to the star shaft 34 but located externally of the container 10. It will be appreciated that the rotational movement of the star shaft 34 may be contolled by the rotary movement of the control knob 38 in a manner which is apparent from FIG. 1 of the drawings. As is further illustrated in FIG. 1, the star shaft 34, being interposed between the hopper 20 and the product ramps 30 and 32 respectively blocks the bulk product B from exiting onto either of the exit ramps 30 and 32 unless it is rotated and/or manipulated by means of the control knob 38. It will be further be observed that the counter clockwise movement of the control knob 38 will cause a concommitment counter clockwise rotational movement of the star shaft 34, such that bulk product captured from the hopper 20 will be deposited onto the upper surface of the first product ramp 30. On the other hand, the clockwise rotational movement of the star shaft 34 will cause product to be captured in the product compartments 36 and delivered to the second product ramp 32 located beneath the first product ramp 30. It will be noted that the second product ramp 32 is mounted on a perceptible decline extending from the lower portion of the hopper 20 toward an exit chute 50 such that bulk product B delivered to the second product ramp 32 will automatically travel down the declined path thereof and into the exit chute 50. The exit chute 50 is shown to be provided with a receptacle collar 52 which permits the disengageable engagement of a receptacle, such as a bag 54 thereon. The container 10 is provided with an open chamber 60 which permits user access thereto in order to permit free access to the consumer for inserting the product receptacle 54 onto the collar 52 and to remove the same once bulk product B has been delivered into the receptacle 54.

The dispensing portion 24 is shown to further include scoop means generally indicated by the numberal 40. The scoop means 40 is shown to be formed by a claw 41 which has an enclosed inner chamber 42 wherein bulk product B may be captured for purposes of delivery to the exit chute 50. The claw 41 has a control shaft 44 fixedly secured thereto and extending laterally outwardly through the front wall 28 of the dispensing portion 24. The control shaft 44 is shown to be carried by a movement guide box 46 which is rotatably mounted between opposed sidewalls 15. It will be observed that the control handle 44 is reciprocably carried within the guide box 46 such that the control handle 44 and the attached claw 41 may be reciprocated relative to the product ramp 30. In addition, since the movement guide box 46 is rotatably mounted with respect to the dispensing portion 24 of the container 10, and does in fact carry the claw 41 and control handle 44 thereon, the claw will similarly be arcuately movable within the confines of the dispensing portion 24.

In operation, the operator need only determine whether a small or large quantity of the bulk product is desired, and then simply manipulates the star shaft 34 in either a counter clockwise of a clockwise direction. It is contemplated that if a large amount of product is desired, the control knob 38 is manipulated in a clockwise direction thereby turning the star shaft 34 in a clockwise direction. The spinning of the star shaft 34 in clockwise direction will therefore cause a larger amount of bulk product B to be delivered to the second product ramp 32 and due to the declined posture of the second product ramp 32, the product B will automatically travel down the ramp 32 into the exit chute 50 and be deposited in the receptacle 54. Alternatively, if a smaller amount of product is desired, the operator simply manipulates the control knob 38 controlling the star shaft 34 in a counter clockwise direction, which will thereby capture product from the hopper 20 in the product compartments 36 and deliver the same to the first product ramp 30. It will be noted that the first product ramp 30 includes an upwardly inclined block 31 which arrests the movement of the product B from automatically exiting into the exit chute 50. Once product B has been deposited onto the first ramp 30, the operator may then manipulate the scoop claw 41 by manipulating the control handle 44 in a reciprocal motion, and/or in an arcuate motion via the movement guide box 46. Product B may be captured within the inner chamber 42 of the claw 41, and as the control handle is pulled outwardly, the claw will be drawn toward the product block 31 and carried thereover such that product will drop through the exit chute 50 into the product receptacle 54. It is contemplated that in this manner, the consumer or operator may dispense metered amounts of product into the receptacle 54 until the desired amount of product has been dispensed.

Figure 3:
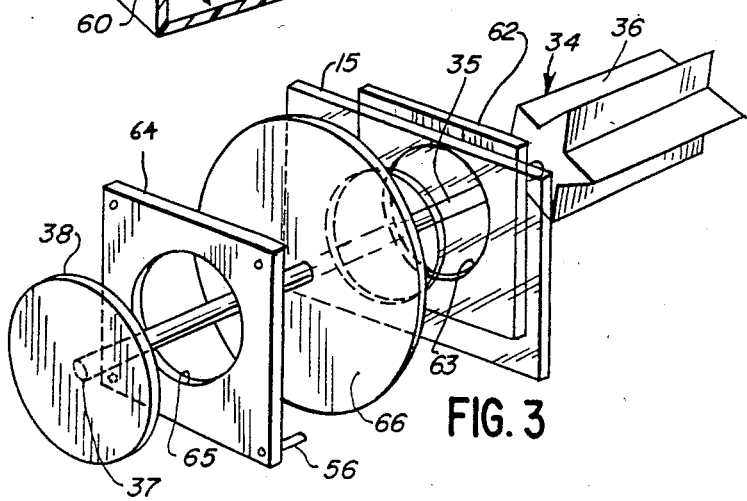
FIG. 3 is an exploded perspective view showing the shaft mounting plates and aperture guard interposed therein and illustrating the means by which the star shaft is mounted to the aperture guard to permit reciprocal as well as rotary movement thereof.
Figure 4:
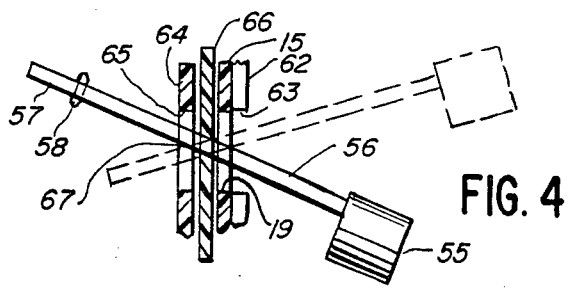
FIG. 4 is a side elevational view, in cross section, illustrating an alternate embodiment of scoop means associated with the aperture guard and shaft mounting plates for capturing product from the product ramp and delivering the same to an exit chute.

With reference to FIG. 3 of the drawings, it will be observed that the manner of mounting the star shaft 34 to the opposed side walls 15 of the container 10 is illustrated. There is provided an interior mounting plate 62 having an enlarged central aperture 63 which is mounted on the interior surface of side wall 15. Side wall 15 would include an aperture (not shown) of equal dimensions to enlarged aperture 63. An external mounting plate 64 is provided, having an enlarged central aperture 65 of equal dimensions to aperture 63. The external mounting plate 64 is mounted on the external surface of the side wall 15 and in registry with the interior mounting plate 62. Star shaft 34 is provided with a mounting shaft 35 which terminates in an external shaft extension 37 as illustrated. The control knob 38 is mounted to the external shaft extension 37 such that manipulation of the control knob 38 controls the movement of the mounting shaft 35 and the star shaft 34 contained within the confines of the container 10.

Interposed between the interior mounting plate 62 and the external mounting plate 64 is an aperture guard 66 which has a diametric dimension greater than the enlarged apertures 63 and 65 respectively. As shown, the aperture guard 66 has the mounting shaft 35 of the star shaft 34 fixedly secured through the center thereof, such that the aperture guard 66 will move when the mounting shaft 35 is similarly moved. It will further be noted that the aperture guard 66 is positioned externally of the side wall 15, and interposed between the external mounting plate 64 and the side wall 15. The external mounting plate 64 is mounted to the side wall 15 with appropriate spacer studs 56 in order to provide a sufficient space for the aperture guard 66 to be movable while interposed between the external mounting plate 64 and the side wall 15.

It will be appreciated that while the side wall 15 is provided with an enlarged aperture 19, the aperture guard 66 functions to block and protect any access which an unauthorized person might have to the interior confine of the hopper 20 despite the fact that the side wall aperture 15 is in registry with the apertures 63 and 65 located in the mounting plate 62 and 64 respectively. It will further be appreciated that the movement of the star shaft 34 may easily be controlled by the control mount 38, and that the star shaft is movable in a rotary direction, and in a radial direction bounded by the diametric sizing of the respective apertures 19, 63 and 65 respectively. It will therefore be appreciated that where the consumer or operator desires to meter and deliver a large quantity of product B from the hopper 20 to the second product ramp 32, he may manipulate the star shaft 34 in a radially upward direction thereby to increase the opening as between the hopper 20 and the second product ramp 32. Hence a great degree of bulk product B will then drop onto the second ramp 32 and be directed into the product receptacle 54 automatically due to the decline associated with the second product ramp 32. Alternatively, by moving the star shaft 34 in a radially downward direction, the spacing as between the hopper and the respective ramps 30 and 32 is decreased to a minimum, thereby permitting the operator to dispense a small limited amount of product B onto the first ramp 30 if the counter clockwise rotation of the star shaft is effected by manipulating the control knob 38 accordingly. Hence, the provision of a pair of product ramps 30 and 32 as well as the configuration of the mounting plates 62 and 64 respectively permits either a small amount of product to be metered, or a greater amount of product to be metered into a product receptacle 54. The drawings illustrate an alternative embodiment for scoop means for use with a sealed container 10.

In this embodiment, mounting plates 62 and 64 are shown to be mounted relative to the side wall 15, with an aperture guard 66 protecting the interior confines of the hopper from access by the consumer. In this embodiment, the scoop cup 55 shown to be provided within the interior confines of the container 10, which is controlled by means of a shaft 56 fixedly secured to the scoop cup 55 at one end, and extending outwardly through the aperture guard 66 to an outer handle 57. A shaft stop 58 is provided adjacent the outer handle 57 thereby to prevent the shaft 56 from being forced through the aperture guard 66 into the interior confines of the container 10. It is contemplated that in this embodiment, a shaft 56 extends through a central guard aperture 67 and is slideably carried therethrough. Hence, a reciprocable as well as arcuate movement may be achieved by manipulating the handle 57 thereby to manipulate the corresponding scoop cup 55 in order to capture and deliver product as previously described.

Figure 5:
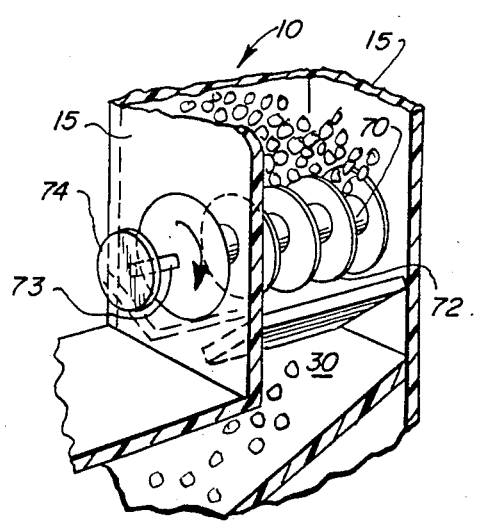
FIG. 5 is a side elevational view, in cross section, illustrating an alternate embodiment of a metered dispensing means for metering product from the hopper to the product ramps.

In FIG. 5, there is illustrated an alternate embodiment of a metering dispensing means which may be employed in connection with the present invention in lieu of the star shaft 34. In this embodiment, it is contemplated that the metering dispensing device may be in the form of an auger 70 which is shown to be rotatably mounted between opposed side walls 15. The auger is carried by an auger shaft 72 which extends laterally outwardly through the side wall 15 to terminate in a shaft extension 73. A control knob 74 is shown to be fixedly mounted to the shaft extension 73 such that the auger 70 may be manipulated by the operator externally of the container 10. It will be appreciated that the rotary movement of the auger 70 will cause product B to be captured by the auger and delivered to the product ramp 30 after which the operator may then manipulate the scoop means to deliver product to the exit chute and into the product receptacle. It is contemplated however, that in the preferred embodiment, the star shaft 34 configuration for a metering dispensing system is preferred.

Figure 2:
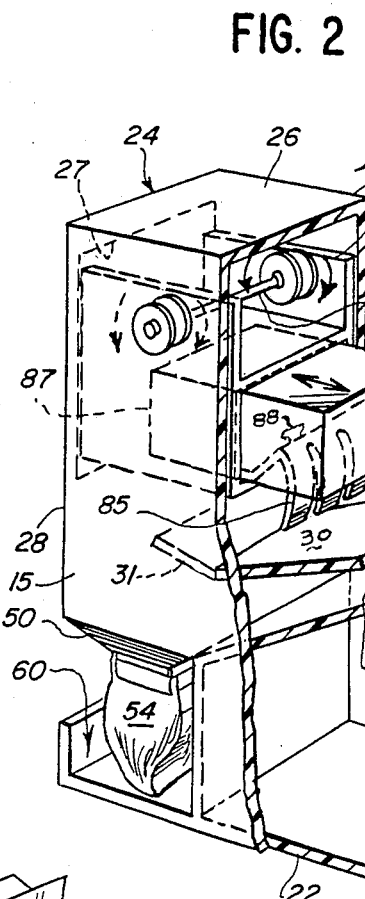
FIG. 2 is a plan view, partly in cross section, illustrating an alternate embodiment of a sealed barrier container wherein an alternate format for the scoop means is illustrated.

With respect to FIG. 2 of the drawings, an alternative embodiment of the sealed container 10 is illustrated. For sake of convenience, similar elements will be numbered similarly with respect to the device as illustrated in FIG. 1 for clarity purposes, with only the new structures being designated with alternate numerals.

As illustrated therein, the container 10 is similarly shown to be bounded by back wall 13, opposed side walls 15, and it is contemplated that the upper portion (not illustrated) would be constructed similarly to the upper portion 12 as illustrated in FIG. 1. Again, first and second product ramps 30 and 32 respectively are provided, and a star shaft 34 is again rotatably mounted in interposed relationship as between the hopper and the product ramps. In this embodiment, the scoop means 80 assumes an alternate configuration. The scoop means 80 is formed by a control box 82 which is rotatably mounted by means of a shaft 83 between the opposed side walls 15 within the dispensing portion 24 of the container 10. As observed in FIG. 2, the control box 82 is pivotally mounted by means of the shaft 83 relative to the side walls 15, pivoting in the direction of the arrows as illustrated in FIG. 2. The control box 82 includes a claw 85 which is fixedly secured within a claw box 86 which is designed to be horizontally reciprocable within a guide box 87. The sliding movement of the claw box 86 with respect to the guide box 87 may be accomplished by any known mechanical means, such as grooves and rails, or other similar means. It is not deemed to be particularly relevant with respect to the present invention as to any particular mechanical means employed for stabilizing the sliding movement of the claw box 86 relative to the guide box 87 other than to permit ease of sliding movement between those elements. The claw 85 is shown to be provided with a knob 88 which permits the operator to grasp same in order to control the movement of the claw box 86 and the claw 85. In this embodiment, it will be noted that the front wall 28 of the dispensing portion 24 includes an access opening 27 in order to permit the consumer to insert their hand into the interior confines of the claw box 86 in order to grasp claw 85 by means of the knob 88. Once the knob 88 has been grasped, the operator may move the claw box 86 inwardly relative to the product ramp 30, such that product B delivered to the ramp 30 may be grasped by the claw 85. It will also be appreciated that the operator may bring the claw 85 downwardly into contact with the product by pivoting the control box 82 such that the entire assembly is brought down into product contact with any product contained on the rim 30. Product is delivered to the exit chute 50 by pulling back on the control knob 88 thereby withdrawing the claw box 86 back outwardly relative to the guide box 87 such that the claw 85 pulls the product over the upwardly inclined block 31 and into the product receptacle 54 via exit chute 50 in the manner previously described.

Figure 6:
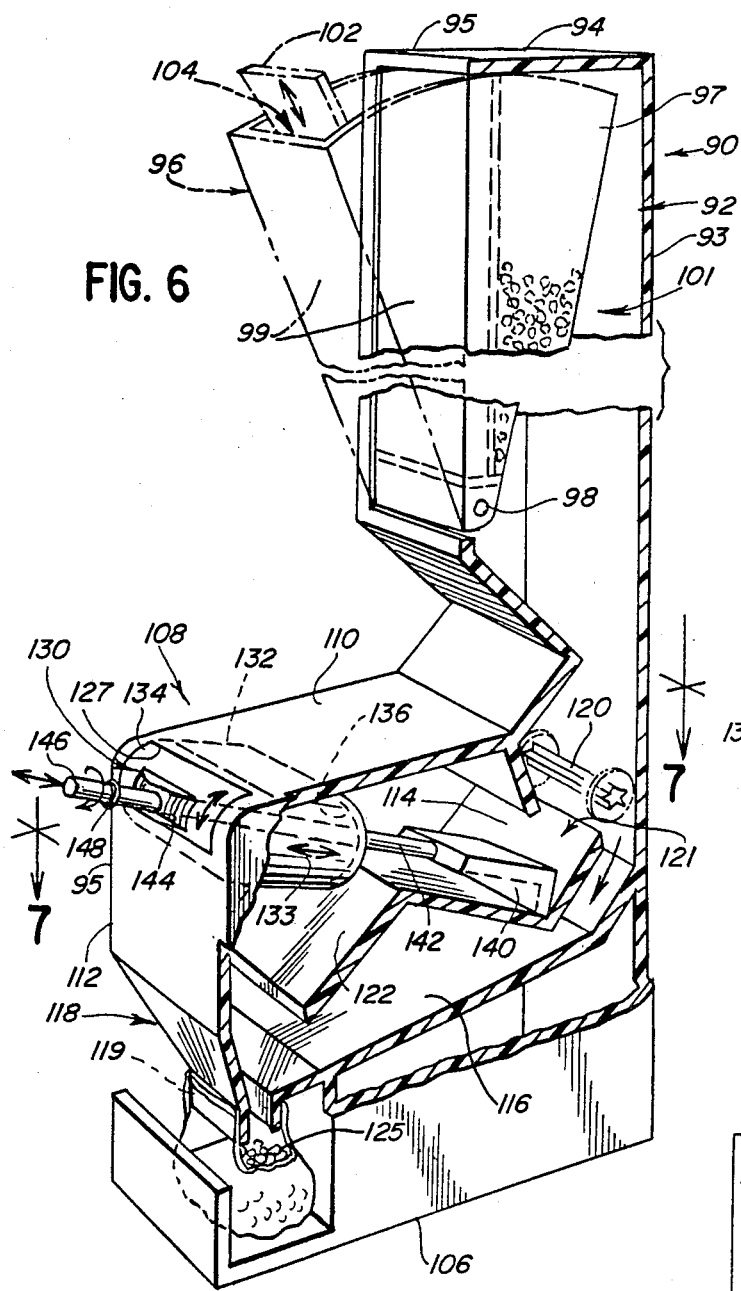
FIG. 6 is a plan view, partly in cross section, illustrating an alternate embodiment of a hopper having a pivotally movable access panel, and an alternate embodiment of scoop means associated with the product ramp for achieving arcuate, reciprocal and rotatable movement of the scoop means relative to the product ramp.

With respect to FIG. 6 of the drawings, a further alternate embodiment of a sealed container in accordance with the present invention is illustrated. There is shown a sealed container 90 which includes an upper portion 92 formed by a back wall 93, top wall 94 and opposed side walls 95. An access panel 96 is provided, which is constructed in the form of a hopper 97 pivotally secured to opposed side walls 95 by means of pivot pins 98 adjacent the lower end of the upper portion 92. The hopper 97 provides the access to the product chamber 101 in a manner similar to the embodiment illustrated in FIG. 1. The hopper 97 is provided with a block wall 102 which may be slideably movable within the confines of the hopper 97. The block wall 102 is spaced slightly rearwardly of the front wall 99 of the hopper 97 such that a display chamber 104 is created for product display. It will be appreciated that during the filling operation, the hopper 97 is pivotally moved to its open position as illustrated in phantom, and the block wall 102 slideably moved upwardly such that bulk product may then be introduced via the hopper 97 into the food chamber 101. Thereafter, the block wall 102 is slid inwardly into the confines of the hopper 97 and display product then inserted into the display chamber 104. The hopper 97 may then be pivotally secured back into the confines of the food chamber 101 and lockingly engaged in position in any known manner. The lower portion of the container 90 is shown to include a base 106 which supports the container 90 on any underlying support surface. Intermediate the upper portion 92 and the base 106 is a dispensing portion 108 which is enclosed by means of a top wall 110, front wall 112 and opposed side walls 95. The dispensing portion 108 is shown to further include a first product ramp 114, and a second product ramp 116, in a manner similar to the emodiment as illustrated in FIG. 1. Interposed between product chamber 101 and the ramps 114 and 116 respectively is a star shaft 120 constructed in a manner similar to that as previously described. Furthermore, and as previously described, the star shaft 120 when operated in a counter clockwise direction is designed to deliver product to the first product ramp 114, and when manipulated in a clockwise direction, will deliver product to the second product ramp 116. As illustrated, the second product ramp is inclined in a direction toward the exit chute 118 such that product delivered to the second product ramp 116 will automatically be delivered to the product receptacle 125 which, again, may be disengageably engageable on a collar 110 in the manner previously indicated.

As further illustrated in FIG. 6, the first product ramp 114 is shown to include a V-shaped chamber 121 into which bulk product B may be delivered from the product chamber 101 by means of the star shaft 120. The outer edge of the V-shaped chamber 121 includes a product delivery ramp 122 which is inclined in the direction of the exit chute 118 such that product directed over the edge of the V-shaped chamber 121 will be directed by the product delivery ramp 122 into the product receptacle 125.

The embodiment illustrated in FIG. 6 further shows alternate scoop means 130 associated therewith. A scoop means 130 is shown to include an interior cylinder guide 132 which is fixedly secured within the interior confines of the dispensing portion 108. Carried within the confines of the cylinder guide 132 is a scoop cylinder 134 which is adapted to ride within the confines of the cylinder guide 132, as briefly illustrated by the arrows 133. The interior edge of the cylinder guide 132 is provided with a peripheral stop lip 136 which functions to arrest the movement of the scoop cylinder 134 within the confines of the cylinder guide 132. It will further be noted that the scoop cylinder 134 carries a scoop 140 which is positioned to be in operative relationship with respect to the first product ramp 114, and more specifically, the V-shaped chamber 121 associated therewith. The scoop 140 has a scoop handle 142 fixedly secured thereto and extends rearwardly through the cylinder guide 132 and is carried by a handle mount which is rotatably secured within the scoop cylinder 134. The handle extends through the handle mount 144 to an exterior grasp portion 146 which allows the operator to grasp and control the movement of the scoop 140. Grasp portion is provided with a stop boss 148 which functions to prevent the handle 142 from moving through the handle mount 144 beyond the stop boss 148.

The scoop handle 142 is mounted through the handle mount 144 such that the same may be reciprocated toward and away from the interior confines of the dispensing portion 10 while at the same time, the scoop handle 142 may be rotatably movable within the confines of the handle mount 144 as well. Hence, the reciprocating movement of the scoop 140 relative to the V-shaped chamber 121 is accomplished by means of the movement of the scoop cylinder 134 within the confines of the cylinder guide 132, as well as the reciprocating movement of the scoop handle 142 within the confines of the handle mount 144. Furthermore, it will further be noted that the scoop cylinder 134 is arcuately movable within the confines of the cylinder guide 132, the arcuate movement being bounded by the slotted opening 127 formed in the dispensing portion 108. It will be noted that the handle mount 144 extends outwardly with respect to the scoop cylinder 134 for a short distance, thereby functioning as a stop guide for arresting the arcuate movement of the scoop cylinder 134 with respect to the cylinder guide 132.

It will therefore be appreciated that the scoop means 130 as illustrated in FIG. 6 of the drawings permits a sufficient degree of movement of the scoop 140 within the V-shaped chamber 121 such that bulk product may easily be arrested and delivered to the exit chute 118 by the operator thereof.

With respect to FIG. 7 of the drawings, the embodiment as illustrated therein merely is attempting to indicate that where desired, the scoop means 150 may include a pair of scoop fixtures consisting of a scoop chamber 152 and a scoop rake 154. Each of the scoop chambers 152 and scoop rake 154 includes a handle 155 and 156 respectively, which extend rearwardly out through appropriate slotted openings 158 and 159 provided in the dispensing portion 108. It will be noted in FIG. 7 that like numerals have been utilized to reference similar elements, and in this respect, the movement of the handles 155 and 156 relative to the product ramp 114 is identical to that as described with respect to FIG. 6, and includes an interior cylinder guide 132, scoop cylinder 134 movable therein, and a handle mount 144 for each of the handles 155 and 156. In this manner, each of the respective scoop fixtures consisting of the scoop chamber 152 and scoop rake 154 may be manipulated within the confines of the dispensing portion 108 to arrest and deliver product from the product ramp 114 to the exit chute 118 and into the product receptacle 125. It will further be noted that the scoop rake 154 includes teeth 157 which extend downwardly with respect to the scoop rake 154. It will be appreciated that depending upon the type of product contained within the product chamber 101, it may be more appropriate to rake the procuct from the first product ramp 114 into the exit chute 118. For example, such food products as nectarines, and other fruits, do not lend themselves to being scooped by means of the scoop chamber 152, and it would therefore be more appropriate to use the scoop rake 154. To the contrary, other products such as nuts, or other hard shell food products, do in fact lend themselves to a scooping procedure for dispensing the same, and in such event, the scoop chamber 152 may be employed. Hence, a sealed container of the type including both types of scoop fixtures has an advantage in that the operator is permitted the flexibility of filling the product chamber 101 with any desired product knowing that the fixtures mounted therein may be equally usable by the ultimate consumer.

With respect to FIG. 8 of the drawings, it is contemplated that a sealed container 10 of the type illustrated in FIG. 1 may be designed in varying sizes thereby to accommodate the stacking of one container atop an adjoining container 10. The container base 22 of the upper unit 10 may be designed and sized to correspond with the overall length of the top of the dispensing portion 24 of a second sealed container 10, such that a stacking arrangement may be achieved. It is contemplated that the sealed container 10 as demonstrated in FIG. 1 of the drawings herein may actually be produced in as many configurations as desired, such that multiple stacking arrangements may be achieved. For example, a feature of the sealed containers is made in a substantially small size, it is contemplated that several of such containers may be stacked in the interest of space efficiency. In such an event, it will be noted that the access panels 16 adjacent the top of the units may be designed to pivot in opposite directions relative to one another, such that the hoppers 20 may be easily refilled.

FIG. 9 of the drawings represents still a further embodiment of the subject invention. As illustrated therein, a sealed barrier container 160 is provided which includes an upper portion 162 bounded by a back wall 163, top wall 164, and opposed side walls 165. The embodiment as depicted in FIG. 9 is similar to the embodiment as per FIG. 6 in that an access panel 166 which is pivotally mounted by means of pivot pins 168 is provided. The access panel 166 is formed in the nature of a hopper 167 which permits the operator to fill the container 160 with the desired bulk product. Furthermore, as illustrated with respect to FIG. 6, there is also provided in the embodiment shown in FIG. 9 a product chamber 170 into which the product flows from the hopper 167. The forward portion of the hopper 167 also includes a display chamber 174 formed by a block wall 172 all as previously described. The sealed container 160 is shown to be supported by its base 176 and provided with a dispensing portion 178 located intermediate the base 176 and upper portion 162. The dispensing portion 178 is bounded by a top wall 179, a front wall 180 and opposed side walls 165. The front wall 180 includes a slotted opening 181 which accommodates the scoop means 182 as shown therein. In this embodiment, the scoop means consists of a scoop cylinder 184 which is shown to be rotatably secured by pivot pins 185 mounted on the opposed side walls 165. The scoop cylinder 184 carries a circular handle mount 186 in this embodiment, the scoop means 182 is shown to eliminate the cylinder guide 132 as shown in FIG. 6, and therefore, the scoop cylinder 184 is not reciprocable with respect to the container 160. The scoop means 182 is shown to be completed by the provision of a scoop 188 which has a handle 189 attached thereto which extends rearwardly through the handle mount 186, and outwardly with respect to the front wall 180 of the dispensing portion 178. The outer portion of the handle 189 is shown to include a stop boss 191 which functions to arrest the movement of the handle 189 relative to the interior confines of the V-shaped chamber 121 internally of the container 160.

It will therefore be appreciated that in the embodiment as illustrated in FIG. 9, the scoop 188 may be utilized to scoop product from the V-shaped chamber 121, and to deliver the same to the exit chute 118 and into the procuct receptacle 125. The scoop 188 is therefore movable in an arcuate path due to the pivotal mounting of the scoop cylinder 184 relative to the side walls 165, and is further movable laterally due to the rotary movement of the handle mount 186 relative to the cylinder 184. Furthermore, as with the embodiment illustrated in FIG. 6, the handle 189 is capable of reciprocating movement relative to the handle mount 186 since the handle 189 may move forwardly and rearwardly as illustrated by the arrows (FIG. 9). Hence, the consumer may manipulate the scoop 188 to arrest product from the V-shaped chamber 181, and to withdraw the handle 189 rearwardly toward the outside of the container 160, and then reciprocate the scoop 188 by turning the handle to dump product via the exit chute 118 into the product receptacle 125.

It will further be observed that in this embodiment, it is shwon that a metering dispensing fixture such as a star shaft is not absolutely necessary in order to provide a container permitting metered dispensing of a product therefrom. In this embodiment, the product as delivered via the hopper 167 simply stack fillingly falls down the product chamber 170 into the V-shaped chamber 121, from which is it dispensed by means of the scoop 188. It is therefore contemplated that a container 160 as depicted in FIG. 9 might be more ideally suited for food product which is not readily capable of damage due to stacking, and may be easily dispensed by means of a scoop without the necessity of employing any metering dispensing fixtures. For example, food products such as nuts, hard candy, and like may be dispensed with a container of the type illustrated in FIG. 9.

It will therefore be appreciated that in accordance with the present invention, an improved sealed barrier container providing only limited access to the interior confines of the container and adapted to contain a supply of bulk product for metered dispensing therefrom by utilizing external controls has been provided. Furthermore, the sealed container of the present invention is simplified in construction such that the overall costs of manufacture are maintained at a minimum, while at the same time providing a device which protects product sterility and eliminates any possibility of contact as between unauthorized personnel and the product contained within the container. Furthermore, the sealed container of the present invention has metering dispensing means associated therewith which permits the consumer to meter and dispense any desired quantity of product from the container into a receptacle provided. It will also be noted that various alternative embodiments are possible, and the thrust of the present invention is to illustrate only a few of the embodiments contemplated in terms of metering dispensing means and scoop means for metering and dispensing product from a hopper to an ultimate receptacle.

While there has been described what is as present considered to be the preferred embodiments of the invention, it will be understood that various modifications may be modified therein and it is intended to cover in the appended claims all such modifications as fall within the true spirit and scope of the invention.

We claim:

1. A sealed barrier container providing limited access to the interior confines of the container and adapted to contain a supply of bulk product for metered dispensing therefrom, comprising in combination, an enclosed container having an upper portion, a base for supporting said container, and a dispensing portion positioned intermediate therebetween, said upper portion having a bulk product hopper for containing a supply of bulk product, said hopper being formed by opposed side walls, a front wall and a rear wall, said hopper provided with an access panel movable between an access position and a closed position, a dispensing portion positioned in operative relation with respect to said hopper, said dispensing portion including a product ramp in communication with said hopper and extending outwardly therefrom to an exit chute, scoop means in operative relationship with said ramp and reciprocable with respect to said ramp and said chute, said scoop means including external control means associated therewith and positioned externally with respect to said dispensing portion of said container whereby said control means may be manipulated externally to control and reciprocate said scoop means within said container to dispense product from said ramp to said exit chute, an individualized product receptacle means adapted for disengageable engagement with said exit chute, whereby product contained within said hopper may be dispensed onto said product ramp and said scoop means manipulated by said external control means to dispense product from said ramp into said product receptacle via said exit chute, and said product receptacle disengaged from said exit chute to accommodate the removal of said product from said sealed container.

2. The sealed barrier container as set forth in claim 1 above, wherein said dispensing portion of said container is formed by an enclosed chamber in open communication with said hopper at one end thereof and in open communication with said exit chute at the opposed end thereof, and said dispensing portion further provided with a product ramp extending along the length thereof to receive product from said hopper, and having said scoop means positioned within the confines of said enclosed chamber and in operative relation with respect to said product ramp to permit product dispensing from said product ramp to said product receptacle via said exit chute.

3. The sealed barrier container as set forth in claim 1 above, which further includes metering dispensing means positioned intermediate said hopper and said product ramp and rotatably mounted between opposed side walls in said dispensing portion thereby to dispense metered amounts of bulk product from said hopper to said ramp, whereby product contained within said hopper may be dispensed onto said product ramp by said metering dispensing means and said scoop means manipulated by said external control means to dispense product from said ramp into said product receptacle via said exit chute.

4. The sealed barrier container as set forth in claim 3 above, wherein said metering dispensing means comprises a star shaft rotataby mounted within said hopper between the opposed side walls thereof, and positionally interposed between said hopper and said product ramp, said star shaft adapted to provide multiple product carrying compartments, whereby rotation of said star shaft causes product from said hopper to be deposited in said product compartments while continued rotation of said star shaft carries and delivers said product from said product compartments to said product ramp thereby to place said product in a position for delivery to said exit chute by manipulation of said scoop means by said external control means.

5. The sealed barrier container as set forth in claim 4 above, wherein said container is further provided with two pairs of opposed shaft mounting plates, one of each of said pairs of shaft mounting plates being fixedly secured to the opposed side walls of said hopper, each of said mounting plates having an enlarged aperture centrally positioned therein, each of said pair of mounting plates having an aperture guard interposed between the respective ones of said pair of mounting plates thereby to maintain non-accessibility to the interior confines of said hopper, and said aperture guard being radially movable within the interposed confines of said pair of mounting plates, said star shaft being fixedly secured to the aperture guards at the opposed ends thereof and having shaft extensions extending outwardly from said aperture guards for a distance, and a shaft control means being fixedly secured to said shaft extensions whereby said shaft control means may be grasped by the operator thereby to control the movement of said star shaft in both radial and rotatable directions such that said star shaft may be manipulated to capture product from said hopper within the confines of said product compartments and rotatably manipulated to deposit the product onto said product ramp in the path of said scoop means.

6. The sealed barrier container as set forth in claim 1 above, wherein said scoop means comprises a claw having a substantially enclosed chamber, said claw provided with a control shaft extending laterally outwardly through said dispensing portion of said container, said control shaft having an external grasp to permit an operator to grasp and manipulate said control shaft and said claw in a reciprocable motion thereby to permit said claw to capture product on said ramp within the confines of said enclosed chamber and deliver said product to said exit chute for ultimate delivery to said product receptacle.

7. The sealed barrier container as set forth in claim 6 above, wherein said scoop means further includes a control shaft movement guide, said control shaft being carried by said movement guide and said movement guide being mounted within said enclosed chamber of said dispensing portion and adapted to permit the arcuate and reciprocable movement of said control shaft and claw within said dispensing portion of said container.

8. The sealed barrier container as set forth in claim 7 above, wherein said external control means associated with said control shaft comprises a grasping handle whereby the operator may grasp said grasping handle and control the arcuate and reciprocable movement of said control shaft and attached claw, thereby to capture product on said product ramp and deliver the same to said product receptacle via said exit chute.

9. A sealed barrier container providing limited access to the interior confines of the container and adapted to contain a supply of bulk product for metered dispensing therefrom, comprising in combination, an enclosed container having an upper portion, a base for supporting said container, and a dispensing portion positioned intermediate therebetween, said upper portion having a bulk product hopper for containing a supply of bulk product, said hopper being formed by opposed side walls, a front wall and a rear wall, said hopper provided with an access panel movable between an access position and a closed position, a dispensing portion positioned in operative relation with respect to said hopper, said dispensing portion including a product ramp in communication with said hopper and extending outwardly therefrom to an exit chute, metering dispensing means positioned intermediate said hopper and said product ramp and rotatably mounted between opposed side walls in said dispensing portion thereby to dispense metered amounts of bulk product from said hopper to said ramp, scoop means in operative relationship with said ramp and reciprocable with respect to said ramp and said chute, said scoop means including external control means associated therewith and positioned externally with respect to said dispensing portion of said container whereby said control means may be manipulated externally to control and reciprocate said scoop means within said container to dispense product from said ramp to said exit chute.

an individualized product receptacle means adapted for disengageable engagement with said exit chute, whereby product contained within said hopper may be dispensed onto said product ramp by said metering dispensing means and said scoop means reciprocated by said external control means to dispense product from said ramp into said product receptacle via said exit chute, and said product receptacle disengaged from said exit chute to accommodate the removal of said metered amount of product from said sealed container.

10. The sealed barrier container as set forth in claim 9 above, wherein said dispensing portion of said container is formed by an enclosed chamber in open communication with said hopper at one end thereof and in open communication with said exit chute at the opposed end thereof, and said dispensing portion is further provided with a product ramp extending along the length thereof to receive product from said hopper, and having said scoop means positioned within the confines of said enclosed chamber and in operative relation with respect to said product ramp to permit product dispensing from said product ramp to said product receptacle via said exit chute.

11. The sealed barrier container as set forth in claim 9 above, wherein said dispensing portion includes a first product ramp mounted within the confines thereof, said first ramp being in open communication with said hopper at one end thereof and in open communication with said exit chute at the opposed end thereof, said scoop means being positioned in operative relation with respect to said first product ramp, and said metered dispensing means being interposed between said hopper and said first ramp, and a second product ramp mounted within the confines of said dispensing portion and positioned below said first product ramp, said second product ramp being in open communication with said hopper at one end thereof and in open communication with said exit chute at the opposed end thereof, said metered dispensing means being interposed between said hopper and said second product ramp such that counter clockwise rotation of said metered dispensing means captures product from said hopper and delivers the same to said first product ramp while clockwise rotation of said metered dispensing means captures product from said hopper and delivers the same to said second product ramp, and said second product ramp being mounted along a decline from said hopper to said exit chute such that product delivered to said second product ramp will automatically travel to said exit chute and be deposited in said product receptacle.

12. The sealed barrier container as set forth in claim 9 above, wherein said metering dispensing means comprises a star shaft rotatably mounted within said hopper between the opposed side walls thereof, and positionally interposed between said hopper and said product ramp, said star shaft adapted to provide multiple product carrying compartments, whereby rotation of said star shaft causes product from said hopper to be deposited in said product compartments while continued rotation of said star shaft carries and delivers said product from said product compartments to said product ramp thereby to place said product in a position for delivery to said exit chute by manipulation of said scoop means by said external control means.

13. The sealed barrier container as set forth in claim 12 above, wherein said container is further provided with two pairs of opposed shaft mounting plates, one of each of said pairs of shaft mounting plates being fixedly secured to the opposed side walls of said hopper, each of said mounting plates having an enlarged aperture centrally positioned therein, each of said pair of mounting plates having an aperture guard interposed between the respective ones of said pair of mounting plates thereby to maintain non-accessability to the interior confines of said hopper, and said aperture guard being radially movable within the interposed confines of said pair of mounting plates, said star shaft being fixedly secured to the aperture guards at the opposed ends thereof and having shaft extensions extending outwardly from said aperture guards for a distance, and a shaft control means being fixedly secured to said shaft extensions whereby said shaft control means may be grasped by the operator thereby to control the movement of said star shaft in both radial and rotatable directions such that said star shaft may be manipulated to capture product from said hopper within the confines of said product compartments and rotatably manipulated to deposit the product onto said product ramp in the path of said scoop means.

14. The sealed barrier container as set forth in claim 9 above, wherein said scoop means comprises a claw having a substantially enclosed chamber, said claw provided with a control shaft extending laterally outwardly through said dispensing portion of said container, said control shaft having an external grasp to permit an operator to grasp and manipulate said control shaft and said claw in a reciprocable motion thereby to permit said claw to capture product on said ramp within the confines of said enclosed chamber and deliver said product to said exit chute for ultimate delivery to said product receptacle.

15. The sealed barrier container as set forth in claim 14 above, wherein said scoop means further includes a control shaft movement guide, said control shaft being carried by said movement guide and said movement guide being mounted within said enclosed chamber of said dispensing portion and adapted to permit the arcuate and reciprocable movement of said control shaft and claw within said dispensing portion of said container.

16. The sealed barrier container as set forth in claim 15 above, wherein said external control means associated with said control shaft comprises a grasping handle whereby the operator may grasp said grasping handle and control the arcuate and reciprocable movement of said control shaft and attached claw, thereby to capture product on said product ramp and deliver the same to said product receptacle via said exit chute.

* * * * *